(12) United States Patent
Nakagawa et al.

(10) Patent No.: US 7,623,544 B2
(45) Date of Patent: Nov. 24, 2009

(54) DATA PROCESSING SYSTEM, ACCESS CONTROLLING METHOD, ACCESS CONTROLLING APPARATUS AND RECORDING MEDIUM

(75) Inventors: Shingo Nakagawa, Kanagawa (JP); Toshihiko Sasahara, Kanagawa (JP); Masakazu Murata, Kanagawa (JP); Yukari Hosoya, Kanagawa (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 11/657,218

(22) Filed: Jan. 24, 2007

(65) Prior Publication Data
US 2007/0195827 A1    Aug. 23, 2007

(30) Foreign Application Priority Data
Jan. 26, 2006    (JP)    ............................ 2006-017906

(51) Int. Cl.
*H04L 12/48*    (2006.01)
*H04J 3/16*    (2006.01)

(52) U.S. Cl. ...................................... 370/458; 370/468
(58) Field of Classification Search ................ 370/458, 370/468, 498
See application file for complete search history.

(56) References Cited

U.S. PATENT DOCUMENTS

| | | | |
|---|---|---|---|
| 5,487,035 A | 1/1996 | Nishimura et al. | |
| 5,612,790 A | 3/1997 | Sakamoto et al. | |
| 6,895,015 B1 * | 5/2005 | Chiang et al. | 370/429 |
| 7,114,016 B2 * | 9/2006 | Yang | 710/56 |
| 7,283,556 B2 * | 10/2007 | Mullendore et al. | 370/458 |
| 7,457,312 B2 * | 11/2008 | Weiss et al. | 370/468 |
| 7,490,345 B2 * | 2/2009 | Rakib et al. | 725/111 |
| 7,535,841 B1 * | 5/2009 | Beshai et al. | 370/230.1 |
| 2003/0026287 A1 * | 2/2003 | Mullendore et al. | 370/442 |
| 2006/0274739 A1 * | 12/2006 | Chen | 370/389 |
| 2007/0223515 A1 * | 9/2007 | Urata | 370/458 |
| 2008/0253404 A1 * | 10/2008 | Lampin et al. | 370/498 |

FOREIGN PATENT DOCUMENTS

| | | |
|---|---|---|
| EP | 0 737 929 | 11/2001 |
| EP | 0 936 559 | 6/2004 |
| EP | 1 669 851 | 6/2006 |
| WO | WO 97 03405 | 1/1997 |

\* cited by examiner

*Primary Examiner*—Andrew Lee
(74) *Attorney, Agent, or Firm*—Frommer Lawrence & Haug LLP; William S. Frommer

(57) ABSTRACT

A data processing system including a storage section, a processing section, a control section, and a memory. The control section performing an action to allocate, to all of the ports, a time slot of a period of time which guarantees one seek action within a cycle time period which is the shortest time period within which it is permitted for the ports to successively accept a readout instruction, allocate, when another readout instruction is received, two or more time slots to that one of the ports which is designated by the readout instruction within a first cycle time period, and allocate one time slot to the port designated by the readout instruction within a second cycle time period after the first cycle time period. The processing section being operable to read out data from the storage section within one cluster per one time slot through that one of the plural ports to which the time slot is allocated by the control section and write the read out data into the memory and then process or output the data read out from the memory.

5 Claims, 11 Drawing Sheets

TS ALLOCATION BASIC CONTROL

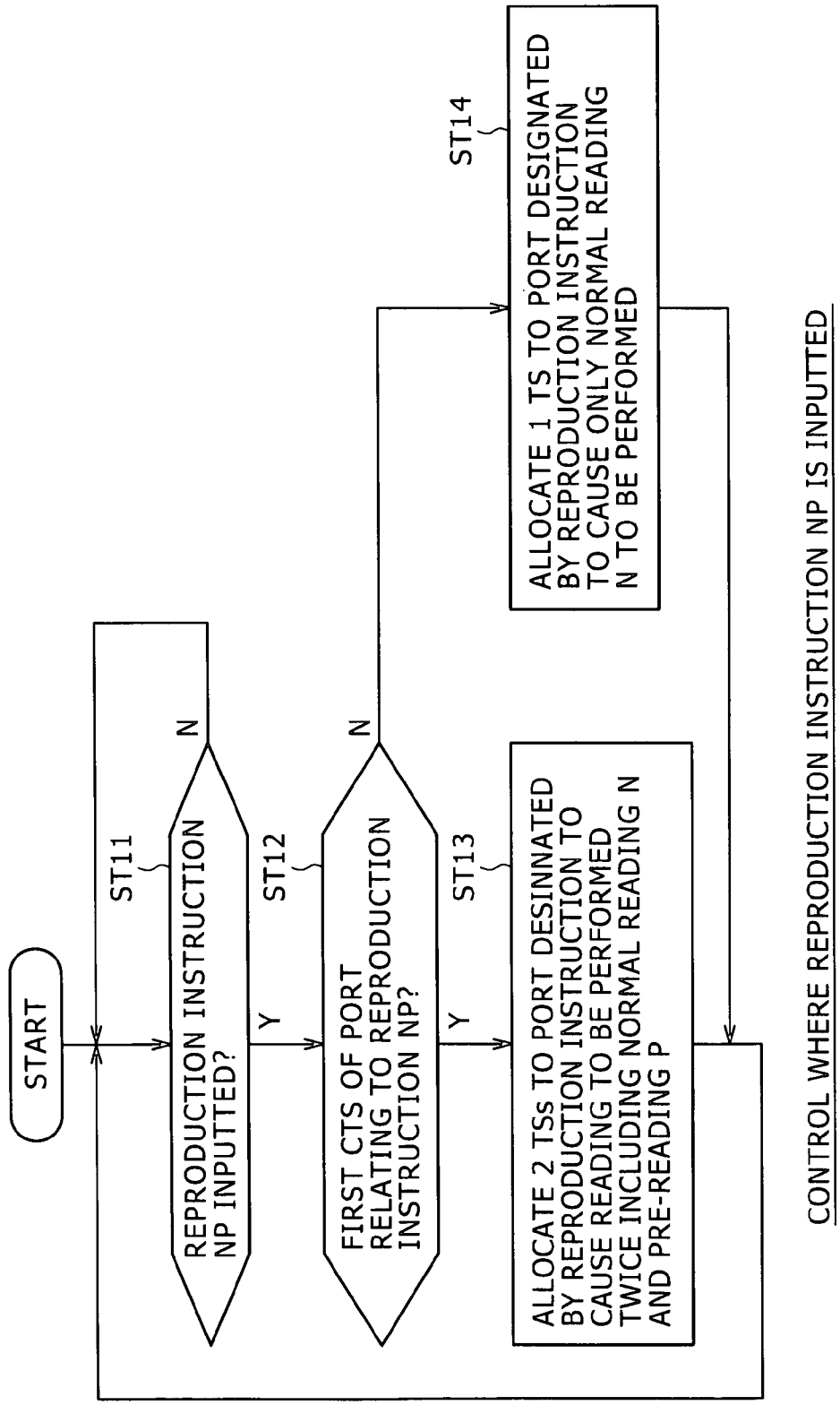

US 7,623,544 B2

DATA PROCESSING SYSTEM, ACCESS CONTROLLING METHOD, ACCESS CONTROLLING APPARATUS AND RECORDING MEDIUM

CROSS REFERENCES TO RELATED APPLICATIONS

The present invention contains subject matter related to Japanese Patent Application JP 2006-017906 filed with the Japanese Patent Office on Jan. 26, 2006, the entire contents of which being incorporated herein by reference.

BACKGROUND OF THE INVENTION

1. Field of the Invention

This invention relates to a data processing system, an access controlling method, an access controlling apparatus and a recording medium wherein a plurality of time slots are allocated to different ports to control accessing to a storage section.

2. Description of the Related Art

A system is available wherein, for example, a plurality of processing apparatus access a storage apparatus such as a RAID (Redundant Array of Inexpensive Disks) and transmit (broadcast) content data read out from the storage apparatus at a predetermined output rate.

The processing apparatus described above access the storage apparatus for various applications in addition to the transmission process described above.

In such a system as described above, a time slot method is adopted such that a fixed period of time within which accessing to the storage apparatus is permitted is allocated at predetermined intervals to each of the plural processing apparatus or ports of the processing apparatus.

Consequently, each of the processing apparatus or the ports accesses the storage apparatus within a period of the time slot allocated thereto.

Such a system as described above is disclosed, for example, in Japanese Patent Laid-Open No. Hei 11-232205.

SUMMARY OF THE INVENTION

Incidentally, in the system described above, if it is tried to successively reproduce (Next Play) a material (current file) of a program being currently reproduced and a material (next file) of a program to be reproduced next, then reproduction data at a joint between the materials are read out within one time slot TS at a timing at which a successive reproduction instruction (command) is received. Then, after Next Delay Time, changeover from the current file to the next file is implemented.

Accordingly, specifications regarding the performance of the storage, the number of ports for which simultaneous on air is guaranteed and so forth are determined assuming that two seeks are required for the current file and two seeks are required for the next file (two seeks are required since stepping over across clusters is involved).

The degree of significance of the seek time is high in the performance of a storage, and in order to implement a multi I/O feature, it is necessary to use an expensive storage which does not take much time for a seek, resulting in a problem of a high cost. As a result, it is obliged to reduce the number of ports for which simultaneous on air can be guaranteed.

Further, in normal use, four seeks are seldom used in R/W of one TS, but are required in order to guarantee the connection of the next file. Therefore, the four seeks may be regarded as overspecification.

Therefore, it is demanded to provide a data processing system, an access controlling method, an access controlling apparatus and a recording medium by which, where access control to a control section which stores data in a plurality of cluster regions thereof and performs a seeking action upon reading out which involves stepping across cluster regions is performed by successively allocating a time slot to a plurality of ports of a processing section thereby to guarantee allocation of time slots to the ports within a fixed period of time, the period of time of the time slots can be reduced to assure a number of ports greater than that which can be assured by a conventional system.

According to an embodiment of the present invention, there is provided a data processing system including a storage section configured to store data in a plurality of cluster regions thereof and perform a seeking action upon reading out which involves stepping across cluster regions, a processing section including a plurality of ports and configured to read out data from the storage section through a data transmission line, a control section configured to allocate time slots for permitting accessing to the storage section in order to the ports, and a memory, the control section performing an action to allocate, to all of the ports, a time slot of a period of time which guarantees one seek action within a cycle time period which is the shortest time period within which it is permitted for the ports to successively accept a readout instruction, allocate, when another readout instruction is received, two or more time slots to that one of the ports which is designated by the readout instruction within a first cycle time period, and allocate one time slot to the port designated by the readout instruction within a second cycle time period after the first cycle time period, the processing section being operable to read out data from the storage section within one cluster per one time slot through that one of the plural ports to which the time slot is allocated by the control section and write the read out data into the memory and then process or output the data read out from the memory.

According to another embodiment of the present invention, there is provided an access controlling method for controlling, when a plurality of ports read out data through a data transmission line from a storage section, which is configured to store data in a plurality of cluster regions thereof and perform a seeking action upon reading out which involves stepping across cluster regions, accessing of the ports to the storage section based on time slots, including a first step of allocating, to all of the ports, a time slot of a period of time which guarantees one seek action within a cycle time period which is the shortest time period within which it is permitted for the ports to successively accept a readout instruction, a second step of allocating, when another readout instruction is received, two or more time slots to that one of the ports which is designated by the readout instruction within a first cycle time period, a third step of allocating one time slot to the port designated by the readout instruction within a second cycle time period after the first cycle time period, a fourth step of writing data read out from the storage section within one cluster per one time slot within the time slots allocated at the first and second steps for each of the ports into a memory, and a fifth step of reading out the data written into the memory at the fourth step and processing or outputting the read out data.

According to a further embodiment of the present invention, there is provided an access controlling apparatus including a storage section configured to store data in a plurality of cluster regions thereof and perform a seeking action upon reading out which involves stepping across cluster regions, and a control section configured to control, when a plurality of ports read out data through a data transmission line from the storage section, accessing of the ports to the storage section based on time slots, the control section being operable to allocate, to all of the ports, a time slot of a period of time which guarantees one seek action within a cycle time period which is the shortest time period within which it is permitted for the ports to successively accept a readout instruction, allocate, when another readout instruction is received, two or more time slots to that one of the ports which is designated by the readout instruction within a first cycle time period, and allocate one time slot to the port designated by the readout instruction within a second cycle time period after the first cycle time period.

According to a still further embodiment of the present invention, there is provided a recording medium on or in which a program is recorded, the program being executed by an access control apparatus including a storage section configured to store data in a plurality of cluster regions thereof and perform a seeking action upon reading out which involves stepping across cluster regions and a control section configured to control, when a plurality of ports read out data through a data transmission line from the storage section, accessing of the ports to the storage section based on time slots, the program comprising a first step of allocating, to all of the ports, a time slot of a period of time which guarantees one seek action within a cycle time period which is the shortest time period within which it is permitted for the ports to successively accept a readout instruction, a second step of allocating, when another readout instruction is received, two or more time slots to that one of the ports which is designated by the readout instruction within a first cycle time period, a third step of allocating one time slot to the port designated by the readout instruction within a second cycle time period after the first cycle time period, a fourth step of writing data read out from the storage section within one cluster per one time slot within the time slots allocated at the first and second steps for each of the ports into a memory, and a fifth step of reading out the data written into the memory at the fourth step and processing or outputting the read out data.

With the data processing system, access controlling method, access controlling apparatus and recording medium, where access control to the control section which stores data in a plurality of cluster regions thereof and performs a seeking action upon reading out which involves stepping across cluster regions is performed by successively allocating a time slot to the plural ports of the processing section thereby to guarantee allocation of time slots to the ports within a fixed period of time, a number of ports greater than that which can be assured by a conventional system can be assured.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a flow chart illustrating control of the processing circuit of the input/output processing apparatus shown in FIG. 2 where a reproduction instruction is inputted.

DETAILED DESCRIPTION OF THE PREFERRED EMBODIMENT

In the following, a content broadcasting and editing system to which an embodiment of the present invention is applied is described.

First, a corresponding relationship between particular elements of the preferred embodiment described below and several features recited in the accompanying claims is described.

RAIDs 10_1 to 10_4 correspond to the storage section.

Figure 2:
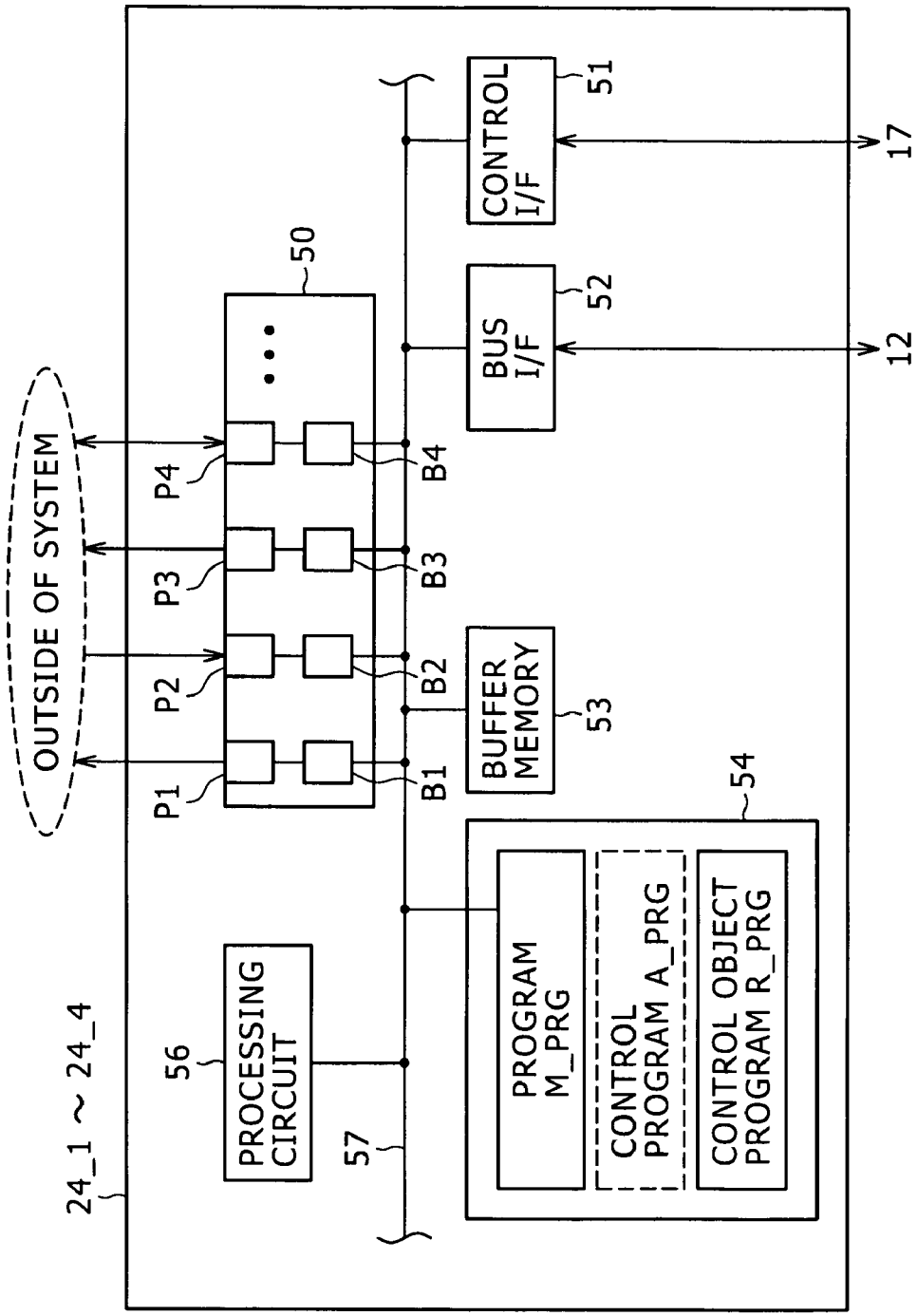
FIG. 2 is a block diagram showing an input/output processing apparatus shown in FIG. 1.

A buffer memory 53 shown in FIG. 2 corresponds to the memory.

A program M_PRG and a control object program R_PRG executed by input/output processing apparatus 24_1 to 24_4 correspond to the processing section.

A control program A_PRG executed by the input/output processing apparatus 24_1 corresponds to the control section.

Further, the input/output processing apparatus 24_1 corresponds to an access controlling apparatus, and the control program A_PRG corresponds to a program.

A data bus 12 corresponds to a data transmission line.

A CTS corresponds to a cycle time period.

Figure 1:
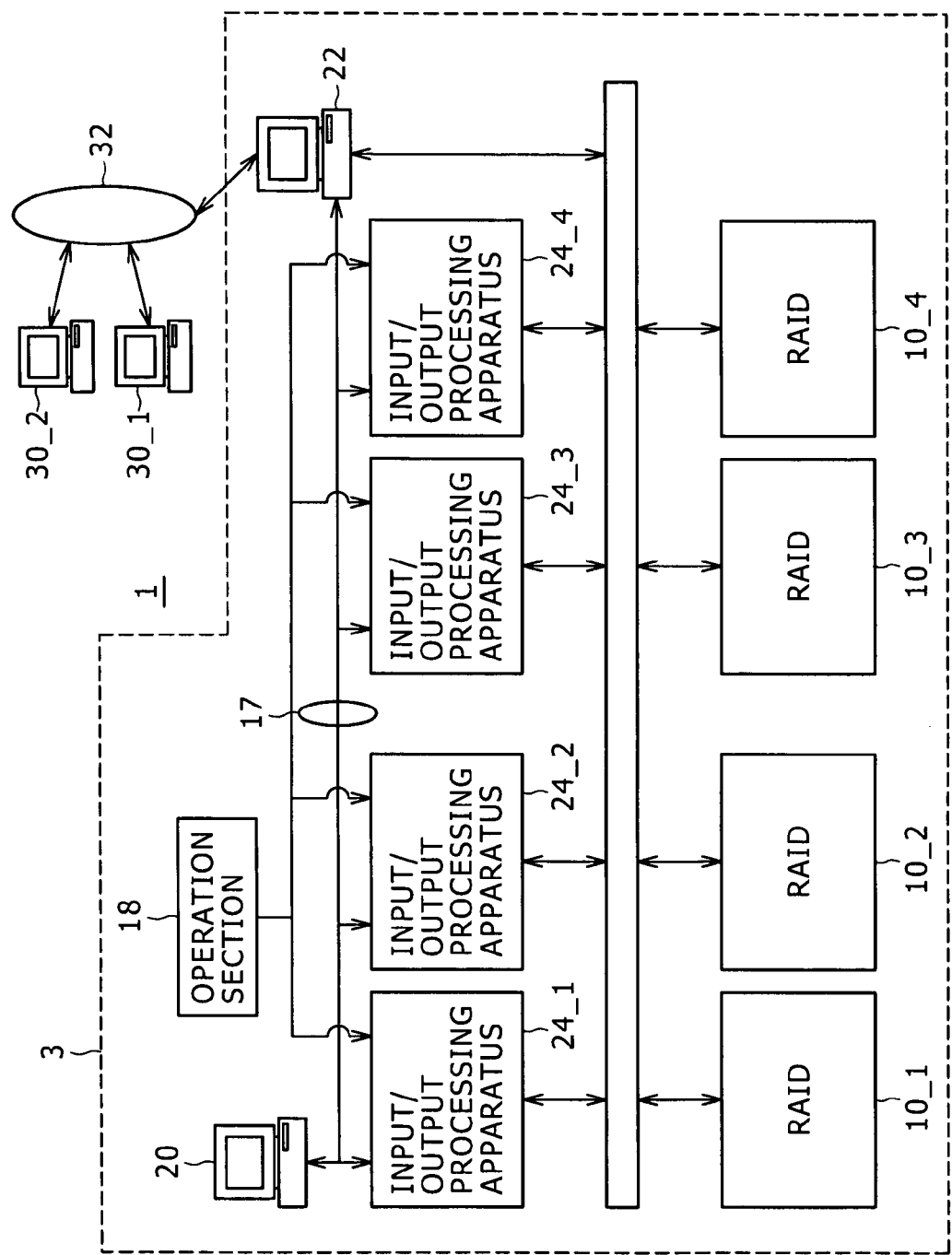
FIG. 1 is a block diagram of an entire configuration of a content broadcasting and editing system to which an embodiment of the present invention is applied.

FIG. 1 shows an entire configuration of the content broadcasting and editing system 1 to which the present invention is applied.

Referring to FIG. 1, the content broadcasting and editing system 1 includes, for example, a broadcasting system 3 and editing terminal apparatus 30_1 and 30_2.

The broadcasting system 3 includes, for example, RAIDs 10_1 to 10_4, a data bus 12, a control signal line 17, an operation section 18, a management server 20, a repeating server 22 and input/output processing apparatus 24_1 to 24_4.

[RAIDs 10_1 to 10_4]

The RAIDs 10_1 to 10_4 are connected to the data bus 12.

The RAIDs 10_1 to 10_4 store content data which may be an object of broadcasting by the input/output processing apparatus 24_1 to 24_4. The RAIDs 10_1 to 10_4 store, for example, individual content data discretely in different RAIDs.

[Operation Section 18]

The operation section 18 may be operation buttons, a remote controller, a computer or the like and outputs an operation signal corresponding to an operation of a user to the input/output processing apparatus 24_1 to 24_4.

[Management Server 20]

The management server 20 retains a storage address, a file name, attribute data and so forth of each of content data stored in the RAIDs 10_1 to 10_4. The management server 20 outputs management data through the control signal line 17 in response to a request from any of the input/output processing apparatus 24_1 to 24_4 and the repeating server 22.

The control signal line 17 may be, for example, an Ethernet (registered trademark).

[Repeating Server 22]

The repeating server 22 repeats inputting/outputting (transmission/reception) of content data between a network 32 to which the editing terminal apparatus 30_1 and 30_2 are connected and the data bus 12.

Further, the repeating server 22 repeats inputting/outputting of a control signal and management data between the editing terminal apparatus 30_1 and 30_2 and the input/output processing apparatus 24_1 to 24_4 and management server 20.

The editing terminal apparatus 30_1 and 30_2 read out, for example, content data from the RAIDs 10_1 to 10_4 through the repeating server 22 and the data bus 12 and use the content data to perform an editing process.

Further, the editing terminal apparatus 30_1 and 30_2 write content data produced by the editing mentioned above into the RAIDs 10_1 to 10_4.

Accessing to the RAIDs 10_1 to 10_4 by the editing terminal apparatus 30_1 and 30_2 is implemented by an asynchronous method which does not guarantee the data transfer rate.

[Input/Output Processing Apparatus 24_1 to 24_4]

FIG. 2 shows a configuration of the input/output processing apparatus 24_1 to 24_4 shown in FIG. 1.

Referring to FIG. 2, each of the input/output processing apparatus 24_1 to 24_4 includes, for example, an inputting/outputting circuit 50, a control interface (I/F) 51, a bus interface (I/F) 52, a buffer memory (bank memory) 53, a memory 54 and a processing circuit 56, which are connected to each other by a data line 57.

The inputting/outputting circuit 50 includes, for example, a plurality of ports and buffer memories coordinated with the ports.

It is to be noted that, although, in the example shown in FIG. 2, four sets of a port and a buffer memory are provided, any number of such sets may be provided.

Where any of the ports shown in FIG. 2 functions as a reproduction port, it outputs, for example, content data of a broadcasting object read out from the RAIDs 10_1 to 10_4 shown in FIG. 1 to the outside of the content broadcasting and editing system 1. The corresponding reproduction buffer memory temporarily stores the content data of the broadcasting object read out from the RAIDs 10_1 to 10_4 and to be outputted to the reproduction port P1.

In the present embodiment, an output of content data to the outside through a reproduction port is used, for example, for such an application as broadcasting and is demanded to guarantee an output rate determined in advance. In other words, it is demanded that the data amount (stored data amount) of data stored in the reproduction buffer memory becomes zero, that is, no underflow occurs.

Further, when any of the ports shown in FIG. 2 functions as a recording port, for example, content data are inputted from the outside of the content broadcasting and editing system 1. The corresponding buffer memory temporarily stores the content data inputted through the recording port before the content data are written into the RAIDs 10_1 to 10_4. In this instance, it is demanded that the buffer memory does not overflow with the content data inputted from the outside and stored.

On the other hand, when any of the ports shown in FIG. 2 functions as a preview port, for example, content data of a preview reproduction (broadcasting) object read out from the RAIDs 10_1 to 10_4 shown in FIG. 1 are outputted to the outside of the content broadcasting and editing system 1. The corresponding buffer memory temporarily stores the content data of the preview reproduction object read out from the RAIDs 10_1 to 10_4 and to be outputted to the preview port P3.

Further, when any of the ports shown in FIG. 2 functions as an asynchronous port, content data are transmitted and received asynchronously to and from another computer or the like through a network not shown outside the content broadcasting and editing system 1. The corresponding buffer memory temporarily stores the content data to be transmitted and received through the asynchronous port. It is to be noted that, in the present embodiment, the output rate is not guaranteed with regard to an output of content data through the preview port or the asynchronous port.

The control interface 51 performs inputting and outputting of a control signal and so forth from and to the other ones of the input/output processing apparatus 24_1 to 24_4, management server 20 and repeating server 22 through the control signal line 17.

The bus interface 52 performs inputting and outputting of content data from and to the RAIDs 10_1 to 10_4 through the data bus 12 shown in FIG. 1.

The bus interface 52 can be occupied only by an arbitrary one of the ports (input/output processing apparatus 24_1 to 24_4) at any timing.

The memory 54 stores a program M_PRG, a control program A_PRG (only the input/output processing apparatus 24_1) and a control object program R_PRG.

The memory 54 of each of the input/output processing apparatus 24_1 to 24_4 stores the program M_PRG which defines basic functions of the same.

Figure 3:
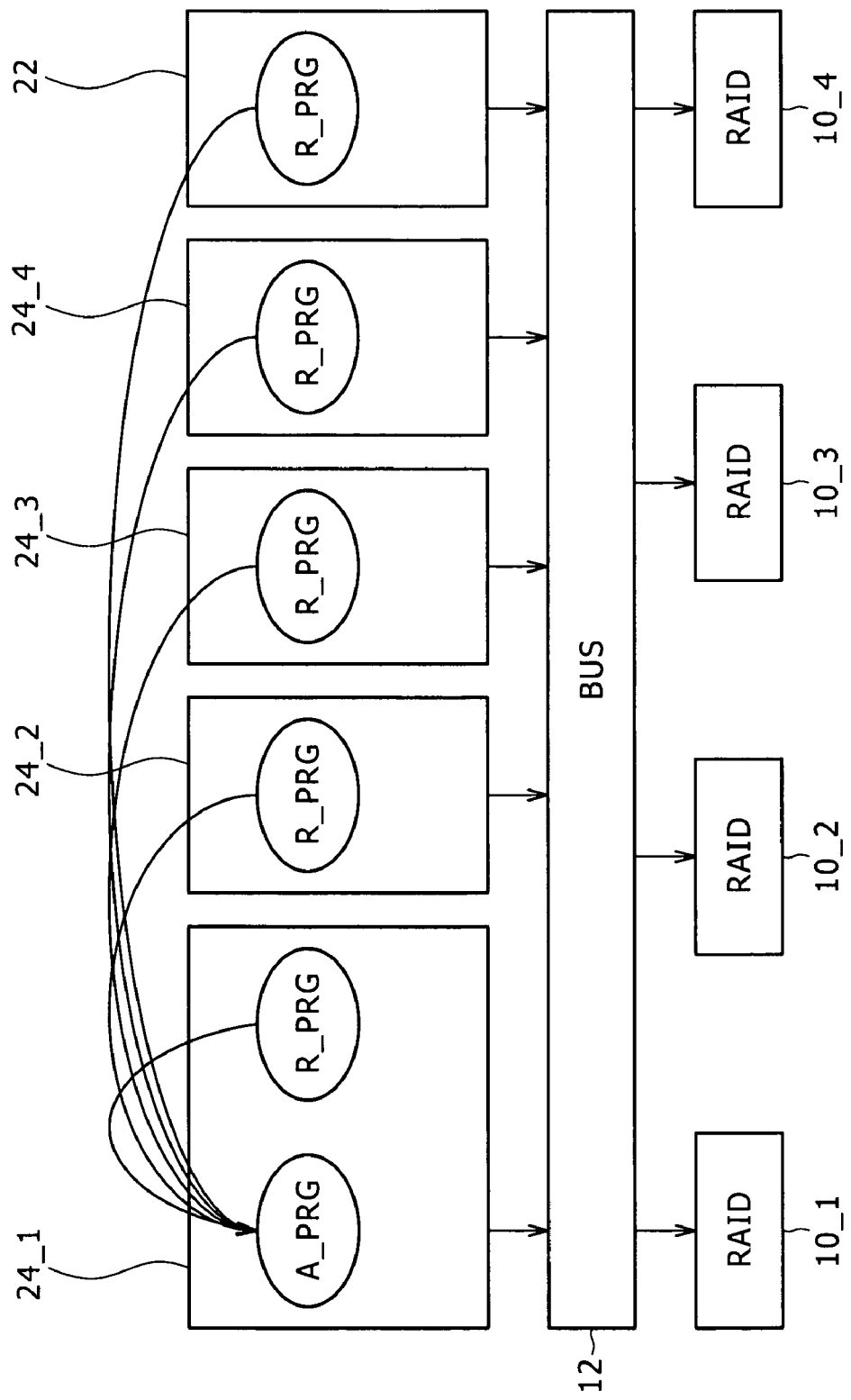
FIG. 3 is a block diagram illustrating functions of a control program and a control object program illustrated in FIG. 2.

Further, as seen in FIG. 3, the memory 54 of the input/output processing apparatus 24_1 stores the control program A_PRG and the control object program R_PRG.

Further, the memories 54 of the input/output processing apparatus 24_2 to 24_4 store the control object program R_PRG.

It is to be noted that also the repeating server 22 stores the control object program R_PRG.

The control object program R_PRG accesses the RAIDs 10_1 to 10_4 through the respective ports within a time slot allocated by the control program A_PRG of the input/output processing apparatus 24_1.

The control program A_PRG successively allocates a time slot for an accessing action to the RAIDS 10_1 to 10_4 to the ports of the input/output processing apparatus 24_1 to 24_4 as hereinafter described.

Processes of the input/output processing apparatus 24_1 to 24_4 based on the control object program R_PRG and the control program A_PRG are hereinafter described in detail.

The processing circuit 56 in the input/output processing apparatus 24_1 to 24_4 performs a predetermined process (data inputting and outputting process) based on the program M_PRG stored in the memory 54.

The processing circuit 56 in the input/output processing apparatus 24_1 to 24_4 controls accessing to the RAIDs 10_1 to 10_4 involved in a process in which the program M_PRG is prescribed based on the control object program R_PRG stored in the memory 54.

The processing circuit 56 of the input/output processing apparatus 24_1 controls processing by the control object program R_PRG executed by the input/output processing apparatus 24_1 to 24_4 based on the control program A_PRG stored in the memory 54.

The control program A_PRG of the input/output processing apparatus 24_1 controls time slots to the ports of the input/output processing apparatus 24_2 to 24_4 as hereinafter described.

The control just mentioned may be performed directly by the processing circuit 56 of the input/output processing apparatus 24_1 based on the control program A_PRG or may be performed by the input/output processing apparatus 24_2 to 24_4 under the control of the processing circuit 56 based on the control object program R_PRG.

In the example described below, the processing circuit 56 of the input/output processing apparatus 24_1 directly executes the control based on the control program A_PRG.

The processing circuit 56 of the input/output processing apparatus 24_1 allocates time slots TS relating to an accessing action to the RAIDs 10_1 to 10_4 to the x ports (P1, P2, P3, P4, . . . ) which the input/output processing apparatus 24_1 to 24_4 have.

In particular, accessing to the RAIDs 10_1 to 10_4 through each of the x ports is permitted only within a period of time to which a time slot TS is allocated for the port.

The following restrictions are applied to reading of the RAIDs 10_1 to 10_4 through the ports of the input/output processing apparatus 24_1 to 24_4.

(A1) To each port, a next reproduction instruction is not inputted within one CTS (Current TS) after a reproduction instruction is inputted.

(A2) A seek occurs if reading is performed for disks of the RAIDs 10_1 to 10_4 across clusters.

(A3) Reading of all ports completes within a predetermined period of time (for example, 3 seconds).

Further, the number of ports increases in proportion to the (time of CTS)/(time of TS), and the period of time of a time slot TS increases in proportion to the number of seeks to be guaranteed within the period of time. Further, it is necessary to guarantee one time of changeover of read data within one TS. Here, there is a demand to set one CTS within a predetermined period of time (for example, a period of time of 36 frames). Accordingly, the number of ports which can be used decreases as the period of time of one TS increases (as the number of seeks to be guaranteed within one TS).

The processing circuit 56 of the input/output processing apparatus 24_1 guarantees one seek within one time slot.

Consequently, when compared with conventional reading (four seeks are guaranteed in four TSs), the period of time of one TS can be reduced, and as a result, the number of ports which can be used can be increased.

Figure 4:
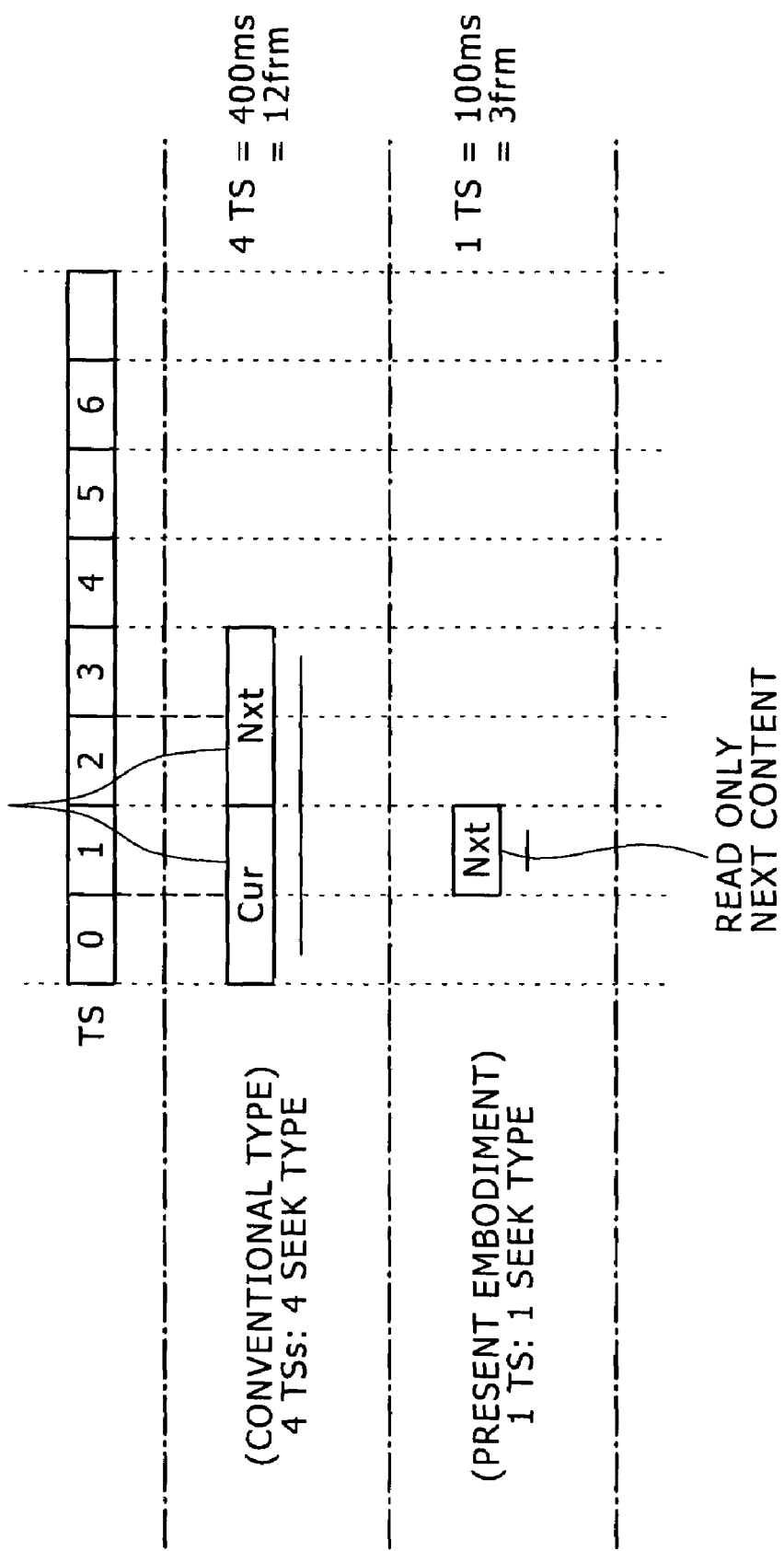
FIG. 4 is a diagrammatic view illustrating a seek action guaranteed by time slots by the content broadcasting and editing system of FIG. 1.

It is to be noted that FIG. 4 shows each port of all ports provided in the input/output processing apparatus 24_1 to 24_4.

The processing circuit 56 has the following configuration in order to implement the guarantee of one seek in one time slot.

(B1) A reading operation of the RAIDs 10_1 to 10_4 is performed without stepping across clusters of a disk.

(B2) Within one CTS within which a reproduction instruction is inputted, reading is performed twice including normal reading and pre-reading thereby to read an amount of data two times that by reading by one time.

Figure 5:
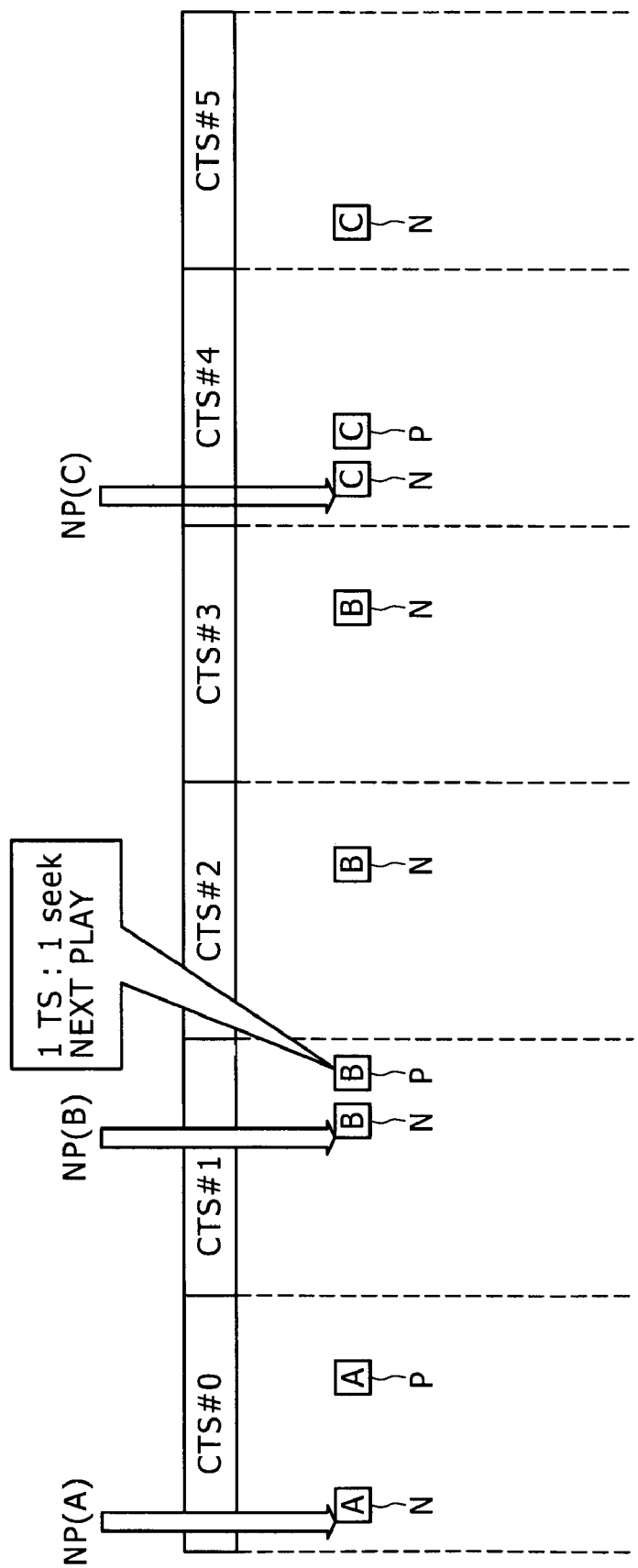
FIG. 5 is a diagrammatic view illustrating an example of action where a reproduction instruction is outputted successively in the content broadcasting and editing system of FIG. 1.

FIG. 5 illustrates an example of the action just described. As seen in FIG. 5, within a CTS #0, two times of reading including communication reading N of an reproduction instruction NP(A) and pre-reading P are performed.

Further, within a CTS #1, two times of reading including communication reading N of an reproduction instruction NP(B) and pre-reading P are performed. Further, within a CTS #4, two times of reading including communication reading N of a reproduction instruction NP(C) and pre-reading P are performed. In the example illustrated in FIG. 5, pre-reading is not performed within any of CTSs #2, #3 and #5, and the TSs of them can be utilized by other ports.

(B3) Within CTSs other than one CTS next to the one CTS within which a reproduction instruction is inputted, only normal reading is performed for the RAIDS 10_1 to 10_4.

In the following, examples of the conventional reading (four seeks are guaranteed within four TSs) and the reading of the present embodiment (one seek is guaranteed within one TS) are described in comparison.

Figure 6:
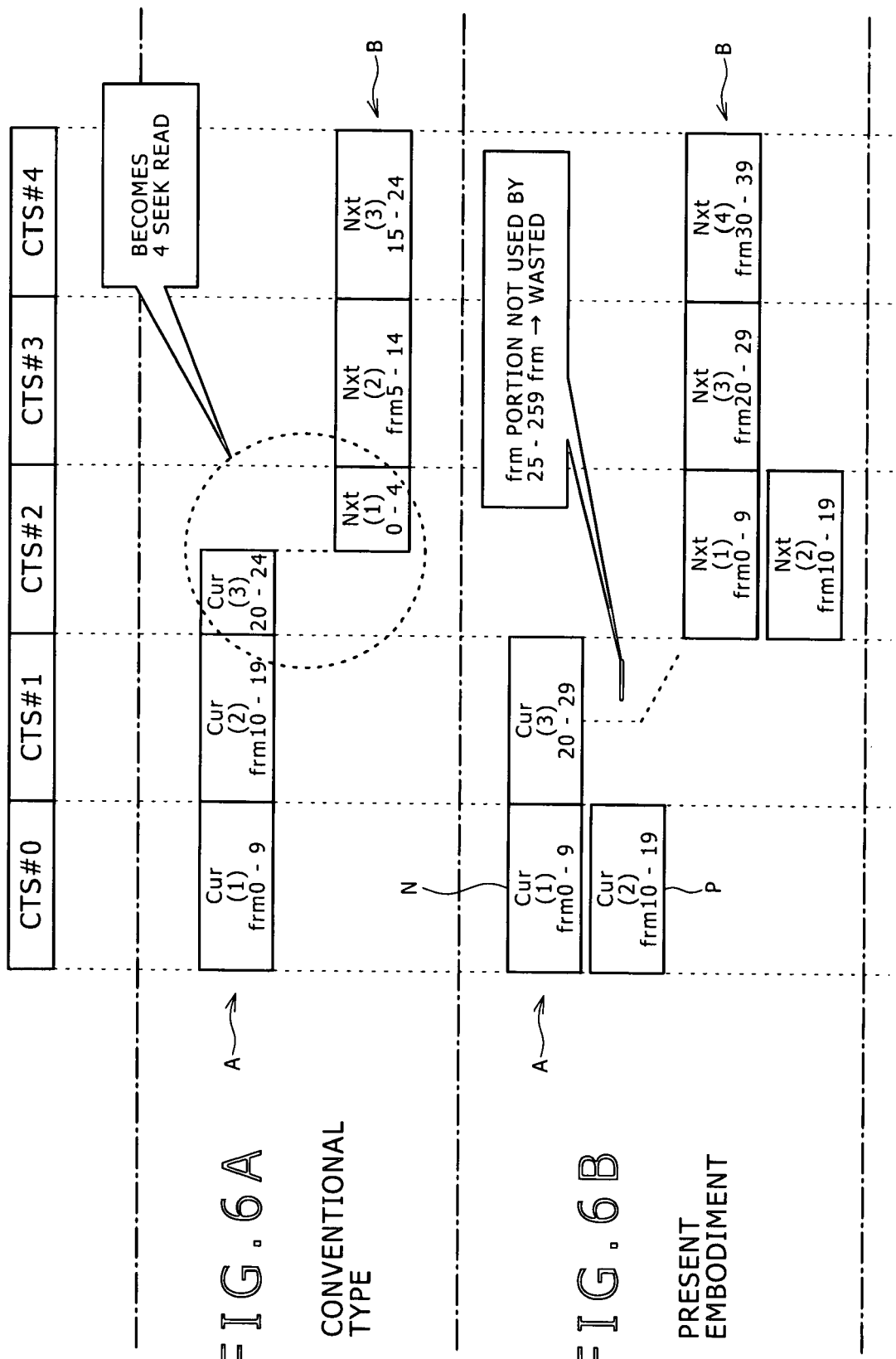
FIG. 6 is a diagrammatic view illustrating content changeover actions by a conventional apparatus and the content broadcasting and editing system of FIG. 1 for comparison.

In the conventional reading, if a reproduction instruction of a content B is issued during reproduction of a content A while reading is performed from the RAIDs 10_1 to 10_4 through a predetermined port as seen in FIG. 6A, then the processing circuit performs, for example, a seeking action of the RAIDs 10_1 to 10_4 subsequently to reading out of frames frm20 to frm24 of the content A within the CTS #2 to read out frames frm0 to frm4 of the content B.

Here, in the conventional reading, four seeks are guaranteed supposing that reading across clusters may occur at a timing of changeover between contents as described hereinabove with reference to FIG. 4.

In contrast, in the present example, the processing circuits 56 of the input/output processing apparatus 24_1 cause frames frm0 to frm9 and frm10 to frm19 for two CTSs of the content A to be read out from the RAIDs 10_1 to 10_4 within the first CTS #0 after the reproduction instruction (content changeover instruction) of the content A and stored (pre-read) into the buffer memory 53 of the input/output processing apparatus 24_1 to 24_4 of an object port as seen in FIG. 6B.

Then, the processing circuits 56 read succeeding frames frm20 to frm29 from the RAIDs 10_1 to 10_4 within a next CTS #1.

After the reproduction instruction of the content B is inputted within the CTS #1, the processing circuit 56 causes frames frm0 to frm9 and frm10 to frm19 for two CTSs of the content B to be read out from the RAIDs 10_1 to 10_4 within the next CTS #2 and stored (pre-read) into the buffer memory 53 of the object port.

Concurrently, the processing circuit 56 reads out the frames frm20 to frm24 of the pre-read content A from the buffer memory 53 and processes the frames.

In the present embodiment, since a pre-reading action is performed and reading which steps across clusters is prevented from being performed as described hereinabove, a changing over action between contents can be performed at an appropriate timing even if one seek is guaranteed for one TS.

Further, a case wherein timings of reproduction instructions NP overlap between a plurality of ports is described with reference to FIG. 7.

Figure 7:
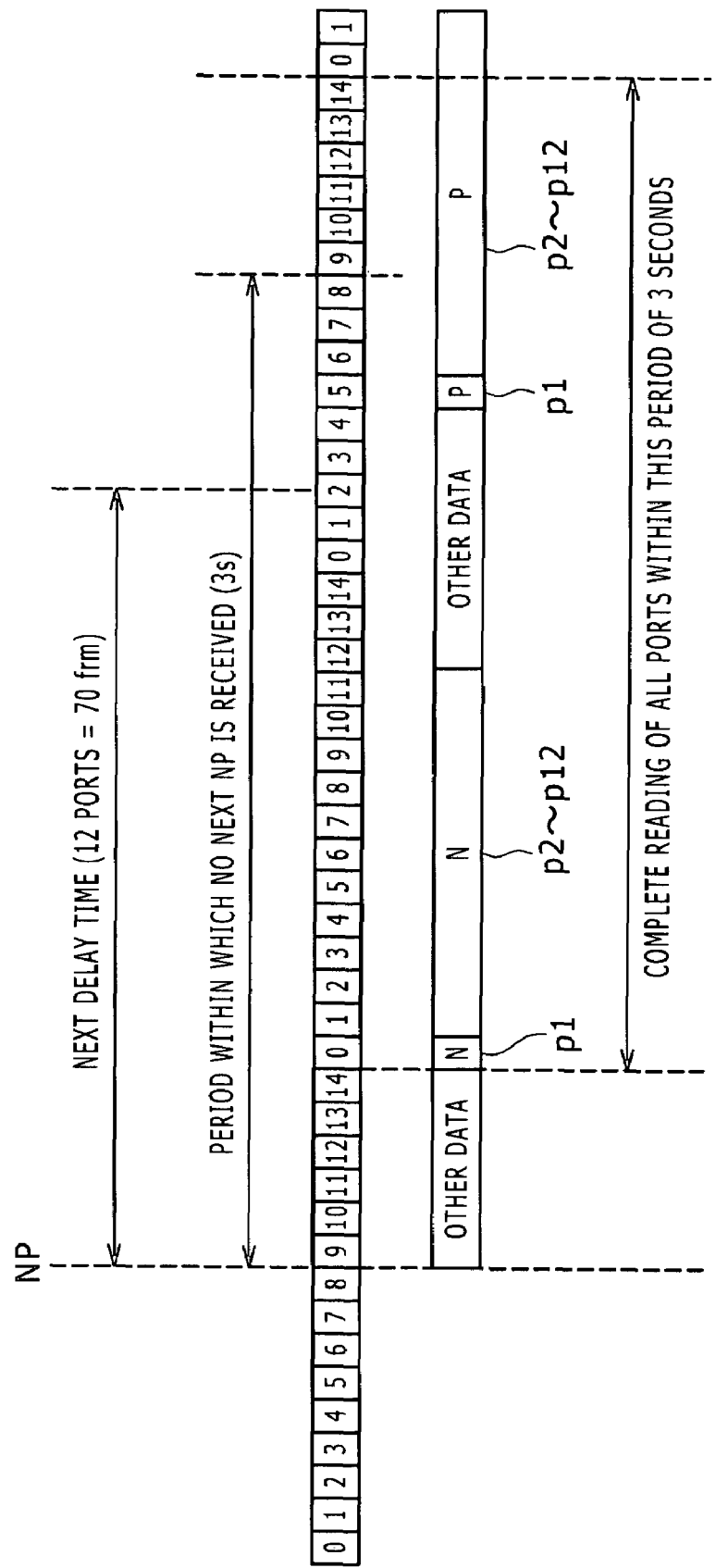
FIG. 7 is a diagrammatic view illustrating an example of a form of allocation of time slots to a plurality of ports in the content broadcasting and editing system of FIG. 1.

If a reproduction instruction NP illustrated in FIG. 7 is issued to a plurality of ports, then communication reading N of the ports p1 to p12 is performed successively within time slots TS0 to TS11 of a next CTS, respectively. Thereafter, with the time slots TS5 to TS14 and time slots TS0 and TS1 of the next CTS, pre-reading P of the ports p1 to p12 is performed.

In FIG. 7, "Next Delay Time" is a fixed delay time period in which changeover from a current file to a next file is performed at a timing later by a period of time of Next Delay Time after a reproduction instruction is issued from a user. Further, the "Next Delay Time" is a fixed delay time period within which the ports can guarantee changeover to a next file even if a plurality of reproduction ports are placed into an on air state simultaneously (that is, even if a reproduction instruction is issued simultaneously to different ports and accessing to the RAIDs is concentrated).

[RAIDS 10_1 to 10_4]

Figure 8:
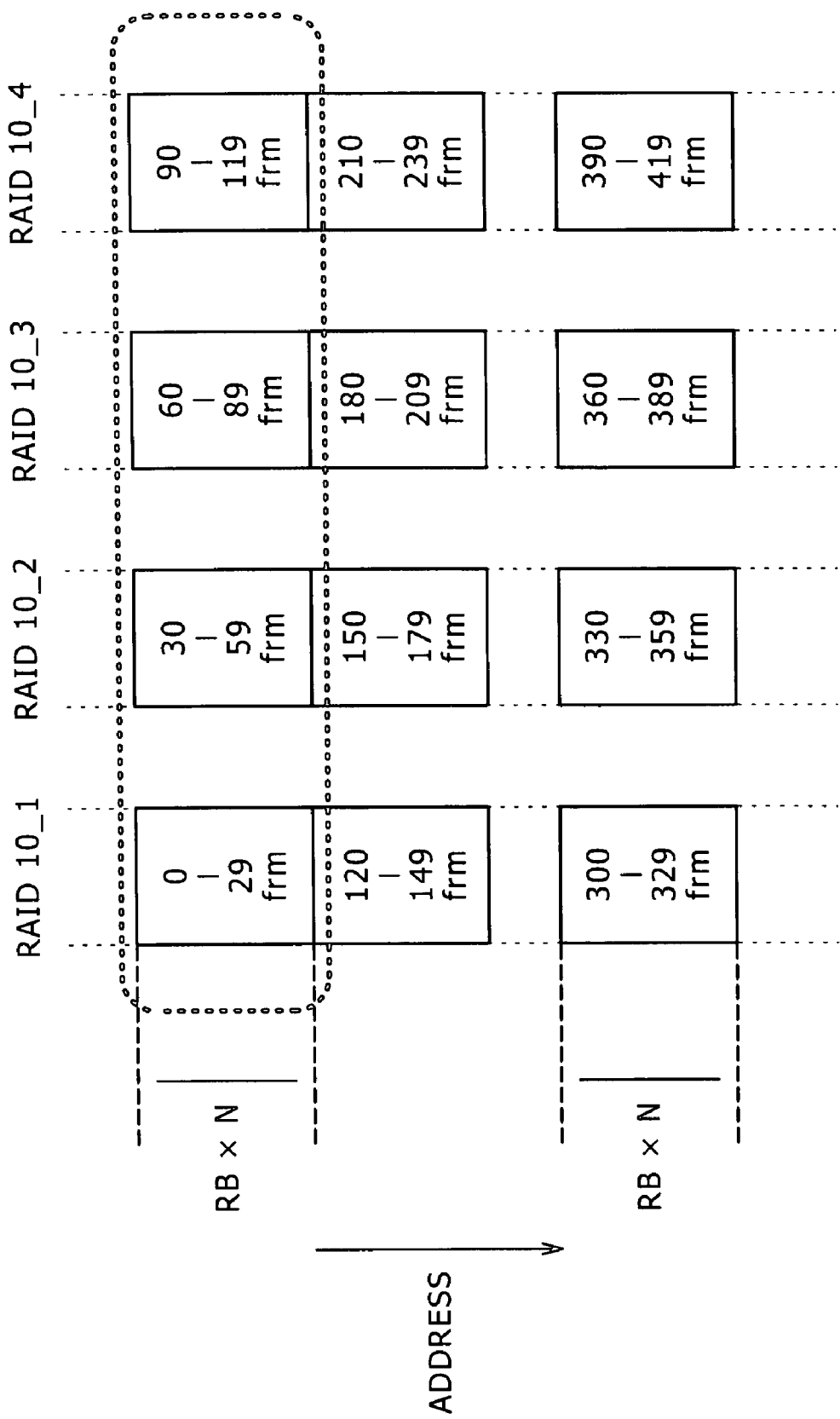
FIG. 8 is a diagrammatic view illustrating a storage state of RAIDs shown in FIG. 1.

The RAIDS 10_1 to 10_4 store, for example, frame data in a unit of 30 frames for two GOPs in such an address pattern as illustrated in FIG. 8 where two GOPs include 30 frames (frm).

Figure 9:
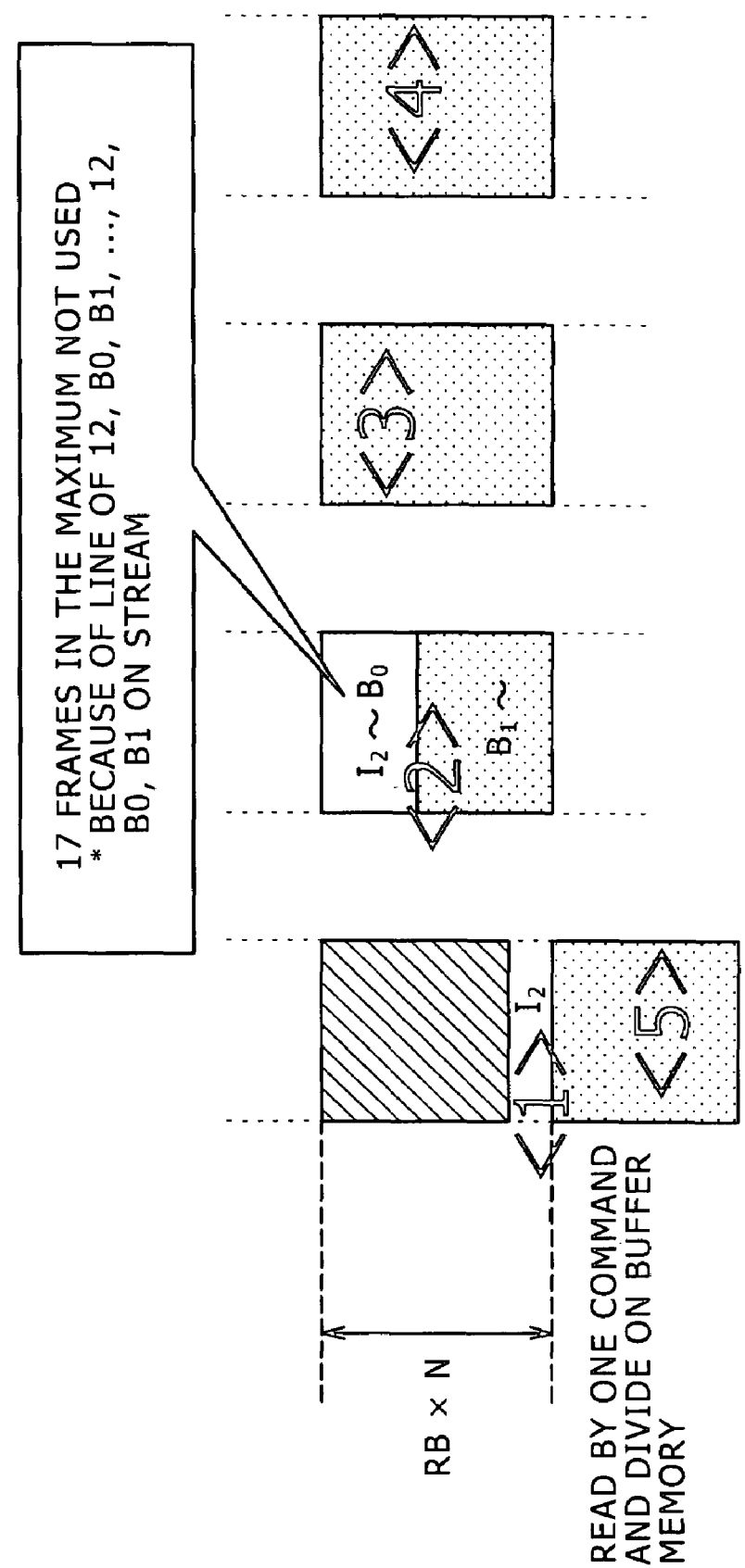
FIG. 9 is a diagrammatic view illustrating a readout pattern of the RAIDs shown in FIG. 1.

Also reading out of the RAIDS 10_1 to 10_4 is performed in a unit of two GOPs (RB×N). In an example illustrated in FIG. 9, reading out of the RAIDS 10_1 to 10_4 is performed in the order of <1> to <5> in a unit of two GOPs, and the read out RAIDS 10_1 to 10_4 are written into the buffer memory 53. Here, depending upon the timing of the reproduction instruction NP, part (portion indicated by slanting lines in FIG. 9) of a readout object of <1> may become unnecessary. In this instance, reading out of the unnecessary frame is not performed.

It is to be noted that reading from one port to the RAIDs 10_1 to 10_4 is performed, for example, within one TS (for example, 8.5 MB/100 ms). Meanwhile, writing from one port into the RAIDs 10_1 to 10_4 is performed within two TSs (for example, 17.0 MB/200 ms).

In the present embodiment, one TS is, for example, 100 ms.

Now, an example of action of the broadcasting system 3 shown in FIG. 1 is described.

In the following description of the example of action, description is given principally of time slot control of accessing to the RAIDs 10_1 to 10_4 from the ports of the input/output processing apparatus 24_1 to 24_4 which is performed by the processing circuit 56 of the input/output processing apparatus 24_1.

FIRST EXAMPLE OF ACTION

Figure 10:
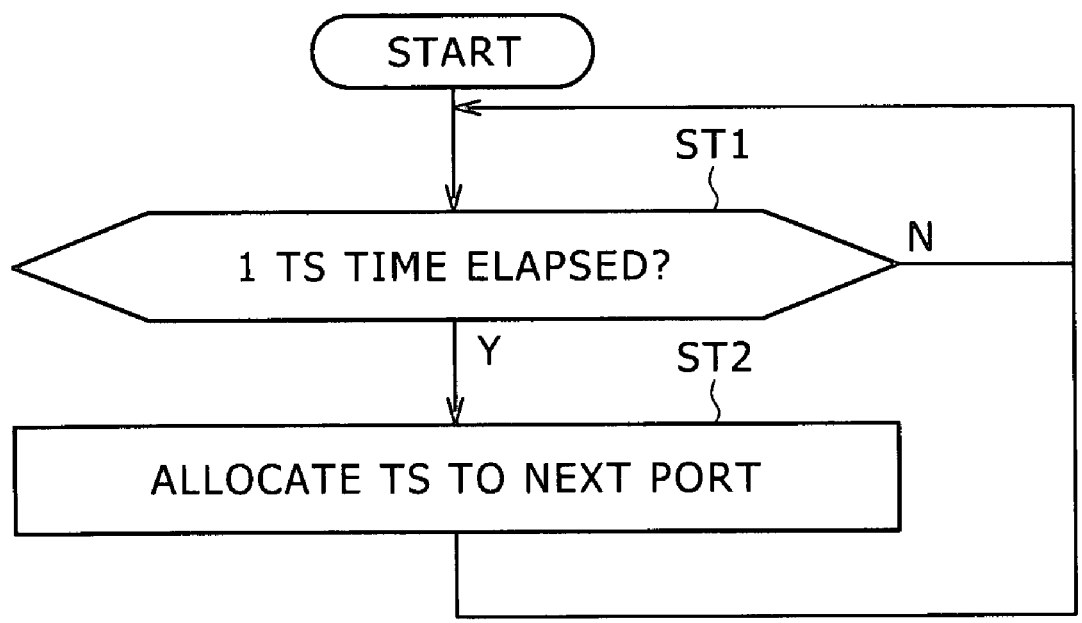
FIG. 10 is a flow chart illustrating basic control regarding time slot changeover by a processing circuit of the input/output processing apparatus shown in FIG. 2.

FIG. 10 illustrates basic control in changeover of a time slot by the processing circuit 56 of the input/output processing apparatus 24_1.

Step ST1:

The processing circuit 56 of the input/output processing apparatus 24_1 decides whether or not one TS elapses. If it is decided that one TS elapses, then the processing advances to step ST2.

Step ST2:

The processing circuit 56 of the input/output processing apparatus 24_1 specifies a port next to a port to which a time slot has been allocated in the preceding action cycle in accordance with an order determined in advance and allocates a time slot to the specified port.

At this time, the processing circuit 56 controls so that a time slot TS is allocated to all of the ports within one CTS.

SECOND EXAMPLE OF ACTION

FIG. 11 illustrates control of the processing circuit 56 of the input/output processing apparatus 24_1 when a reproduction instruction NP is inputted.

The process illustrated in FIG. 11 is executed in parallel to the process of FIG. 10.

Step ST11:

The processing circuit 56 of the input/output processing apparatus 24_1 decides whether or not a reproduction instruction NP corresponding to an operation of the operation section 18 shown in FIG. 1 or the like is inputted. If it is decided that a reproduction instruction NP is inputted, then the processing advances to step ST12.

The reproduction instruction NP includes a designation of a port to which an instruction to change over a readout content is to be issued.

Step ST12:

The processing circuit 56 of the input/output processing apparatus 24_1 decides whether or not the current CTS is the first CTS after the reproduction instruction NP is inputted with regard to the port designated by the reproduction instruction NP inputted at step ST11. If it is decided that the current CTS is the first CTS, then the processing advances to step ST13, but in any other case, the processing advances to step ST14.

ST13:

The processing circuit 56 of the input/output processing apparatus 24_1 allocates two TSs to the port designated by the reproduction instruction NP within the first CTS after the reproduction instruction NP is inputted.

The processing circuit 56 performs normal reading of data to be used (broadcast or processed) within the first CTS and writes the data into the buffer memory 53 within the first one TS from within the two TSs. Then, within the next one TS, the processing circuit 56 performs pre-reading of data to be used within a next CTS and writes the data into the buffer memory 53.

Step ST14:

The processing circuit 56 of the input/output processing apparatus 24_1 allocates one TS to the port designated by the reproduction instruction NP within a CTS other than the first CTS after the reproduction instruction NP is inputted.

The processing circuit 56 performs normal reading of data to be used (broadcast or processed) in the CTS and writes the data into the buffer memory 53 in the one TS.

In this manner, the processing circuit 56 of the input/output processing apparatus 24_1 performs, within 1 CTS within which a reproduction instruction is inputted, two times of reading including normal reading and pre-reading for the RAIDs 10_1 to 10_4 thereby to read an amount of data equal to twice that obtained by one time of reading and writes the read data into the buffer memory 53. Further, within a succeeding CTS, succeeding data are read by normal reading.

Consequently, data to be used in the succeeding CDS are stored precedently into the buffer memories 53 of the input/output processing apparatus 24_1 to 24_4, and even if a reproduction instruction NP is received within the succeeding CTS (even if a changeover of a content occurs), only data after such changeover may be read out from the RAIDs 10_1 to 10_4 within the succeeding CTS. In other words, even if only one seek is guaranteed within one TS, changeover of a content can be implemented within one TS.

As described above, according to the content broadcasting and editing system 1, the processing circuit 56 of the input/output processing apparatus 24_1 controls the reading action of the RAIDs 10_1 to 10_4 so as not to step across clusters of a disk. Further, the processing circuit 56 performs two times of reading including normal reading and pre-reading for the RAIDs 10_1 to 10_4 within one CTS after a reproduction instruction is inputted. Consequently, the processing circuit 56 reads an amount of data equal to twice that obtained by one time of reading.

Therefore, one seek action may be guaranteed within 1 time slot TS, and the time for time slots TS can be reduced when compared with that in the prior art (one TS, four seeks guaranteed). Therefore, the number of ports which can be defined within one CTS can be increased when compared with that of the prior art. Particularly, the number of on air ports for which it is demanded to guarantee accessing to the RAIDs 10_1 to 10_4 at least once within one CTS can be increased. In other words, the number of ports which can guarantee a readout rate can be increased.

The present invention is not limited to the embodiment described hereinabove.

While, in the embodiment described above, the input/output processing apparatus 24_1 to 24_4 and the RAIDs 10_1 to 10_4 are implemented as apparatus different from each other, the input/output processing apparatus 24_1 to 24_4 and the RAIDs 10_1 to 10_4 or all of the components of the broadcasting system 3 may be built in one apparatus housing or one chip.

Further, while, in the embodiment described above, the RAIDs 10_1 to 10_4 are used as a storage section, any other storage apparatus than RAIDS may be used only if it stores data in a plurality of cluster regions and performs a seeking action upon reading out which involves stepping across cluster regions.

Further, the number of the input/output processing apparatus 24_1 to 24_4 or ports may be any plural number.

It should be understood by those skilled in the art that various modifications, combinations, sub-combinations and alterations may occur depending on design requirements and other factor in so far as they are within the scope of the appended claims or the equivalents thereof.

What is claimed is:

1. A data processing system, comprising:
a storage section configured to store data in a plurality of cluster regions thereof and perform a seeking action upon reading out which involves stepping across cluster regions;
a processing section including a plurality of ports and configured to read out data from said storage section through a data transmission line;
a control section configured to allocate time slots for permitting accessing to said storage section in order to said ports; and
a memory;
said control section performing an action to allocate, to all of said ports, a time slot of a period of time which guarantees one seek action within a cycle time period which is the shortest time period within which it is permitted for said ports to successively accept a readout instruction, allocate, when another readout instruction is received, two or more time slots to that one of said ports which is designated by the readout instruction within a first cycle time period, and allocate one time slot to the port designated by the readout instruction within a second cycle time period after the first cycle time period;
said processing section being operable to read out data from said storage section within one cluster per one time slot through that one of said plural ports to which the time slot is allocated by said control section and write the read out data into said memory and then process or output the data read out from said memory.

2. The data processing system according to claim 1, further comprising an additional processing section or sections, one of the processing sections including the additional processing section or sections performing the action of said control section for all ports provided on the processing sections.

3. An access controlling method for controlling, when a plurality of ports read out data through a data transmission line from a storage section, which is configured to store data in a plurality of cluster regions thereof and perform a seeking action upon reading out which involves stepping across cluster regions, accessing of said ports to said storage section based on time slots, comprising:

a first step of allocating, to all of said ports, a time slot of a period of time which guarantees one seek action within a cycle time period which is the shortest time period within which it is permitted for said ports to successively accept a readout instruction;
a second step of allocating, when another readout instruction is received, two or more time slots to that one of said ports which is designated by the readout instruction within a first cycle time period;
a third step of allocating one time slot to the port designated by the readout instruction within a second cycle time period after the first cycle time period;
a fourth step of writing data read out from said storage section within one cluster per one time slot within the time slots allocated at the first and second steps for each of said ports into a memory; and
a fifth step of reading out the data written into said memory at the fourth step and processing or outputting the read out data.

4. An access controlling apparatus, comprising:
a storage section configured to store data in a plurality of cluster regions thereof and perform a seeking action upon reading out which involves stepping across cluster regions; and
a control section configured to control, when a plurality of ports read out data through a data transmission line from said storage section, accessing of said ports to said storage section based on time slots;
said control section being operable to allocate, to all of said ports, a time slot of a period of time which guarantees one seek action within a cycle time period which is the shortest time period within which it is permitted for said ports to successively accept a readout instruction, allocate, when another readout instruction is received, two or more time slots to that one of said ports which is designated by the readout instruction within a first cycle time period, and allocate one time slot to the port designated by the readout instruction within a second cycle time period after the first cycle time period.

5. A recording medium on or in which a program is recorded, said program being executed by an access control apparatus including a storage section configured to store data in a plurality of cluster regions thereof and perform a seeking action upon reading out which involves stepping across cluster regions and a control section configured to control, when a plurality of ports read out data through a data transmission line from said storage section, accessing of said ports to said storage section based on time slots, the program comprising:
a first step of allocating, to all of said ports, a time slot of a period of time which guarantees one seek action within a cycle time period which is the shortest time period within which it is permitted for said ports to successively accept a readout instruction;
a second step of allocating, when another readout instruction is received, two or more time slots to that one of said ports which is designated by the readout instruction within a first cycle time period;
a third step of allocating one time slot to the port designated by the readout instruction within a second cycle time period after the first cycle time period;
a fourth step of writing data read out from said storage section within one cluster per one time slot within the time slots allocated at the first and second steps for each of said ports into a memory; and
a fifth step of reading out the data written into said memory at the fourth step and processing or outputting the read out data.

* * * * *